Aug. 2, 1955  C. W. ZABEL  2,714,707
CIRCULAR POLARIZER
Filed May 3, 1946
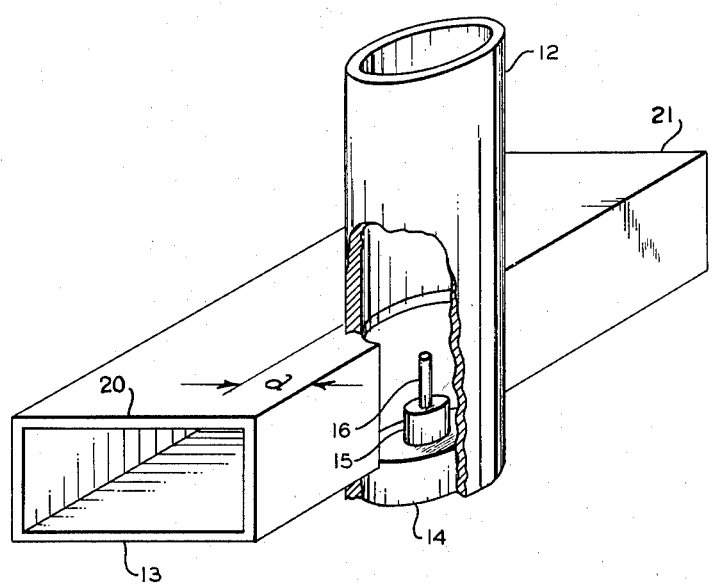
INVENTOR
CARROLL W. ZABEL
BY  *M. A. Hayes*
ATTORNEY

2,714,707

CIRCULAR POLARIZER

Carroll W. Zabel, Cambridge, Mass., assignor, by mesne assignments, to the United States of America as represented by the Secretary of the Navy Application May 3, 1946, Serial No. 666,878

5 Claims. (Cl. 333—21)

This invention relates in general to electrical power transmission and more particularly to a matched hollow wave guide junction used to transform a linearly polarized wave to a circularly polarized wave.

Wave guide junctions and sections in various configurations have been used previously to obtain a transformation of polarization. One such method, described in copending application of Robert H. Dicke, Serial No. 626,848, filed November 5, 1945, now Patent No. 2,686,901, dated August 17, 1954, utilizes tuning plungers in two opposite rectangular branches of a four branch junction, such that incident power in one of the remaining branches will be so reflected that circular polarized power emerges from a fifth circular wave guide symmetrically and perpendicularly joined to the four branch system of rectangular guides. The use of tuning stubs and plungers introduces dimensions which are an appreciable part of a wave length of the energy in the guide, which makes the junction frequency sensitive and difficult to adjust for application to a wide band of frequencies.

Accordingly, it is an object of this invention to provide a simplified junction of hollow wave guides which will transform a linearly polarized wave to a circularly polarized wave.

It is further an object of this invention to provide a junction of hollow wave guides which will transform a circularly polarized wave to a linearly polarized wave.

Another object of this invention is to provide a junction of wave guides for polarization transformation which has broad band frequency characteristics.

These and other objects will be apparent from the detailed description when taken with the accompanying drawing which is an embodiment of the invention showing a junction of a rectangular wave guide section and a circular wave guide section, and the three plungers used for matching the junction.

In the following discussion it is to be understood that the dimensions of the wave guides in the junction are so chosen that the rectangular branch will support radiation only in the $TE_{01}$ mode, and the circular branch will support radiation only in the $TE_{11}$ mode. This can be done, since the chosen modes are the dominant modes for the specified types of wave guide, and so have longer cut-off wave length than any other mode which may be excited in such wave guides. In the $TE_{01}$ mode of the rectangular wave guide, all components of the electric field lie in a plane transverse to the direction of propagation, there are no half-period variations in the density of the electric field across the narrower dimension of the wave guide, and there is one half-period variation in the density of the electric field across the wider dimension of the guide. In the $TE_{11}$ mode in the circular guide, all components of the electric field lie in a plane transverse to the direction of propagation, there being one full-period variation of the radial component of the electric field along the angular direction, and one half-period variation in the angular component of the electric field along the radial direction.

Referring to the drawing, circular wave guide 12 is unsymmetrically joined to rectangular wave guide 13, the longitudinal axes of the two guides being perpendicular to each other but nonintersecting. Circular guide 12 is mounted so that it extends into the broad wall of rectangular guide 13 a predetermined distance $d$, this dimension being so chosen that both series and parallel, that is, electric and magnetic, coupling results between the guides. In addition to the proper selection of distance $d$, three coaxial independently adjustable circular plungers 14, 15, and 16 (of the type described in the aforementioned application), supported within the lower end of wave guide 12, are used to properly match the junction. The position of plunger 14 and the lengths and relative diameters of plungers 15 and 16 are adjusted so that this impedance match is obtained between wave guides 12 and 13. With the junction properly matched, let us assume that energy in the $TE_{11}$ mode is applied at the upper end of circular wave guide 12 and is circularly polarized in a first sense. At the mouth of the circular wave guide 12, in the plane of the junction with the rectangular wave guide 13, the fringing of the electric field results in a vertical electrical field component, which in turn results in the coupling of energy into sections 20 and 21 of the rectangular wave guide. Energy flow in the two sections 20 and 21 is in phase, by which is meant that at equal distances from the junction the direction of the electric field is the same and the electric field vectors are of equal magnitude. This type of coupling may be considered as parallel, or E-plane coupling.

Again, at the junction of the circular wave guide and the rectangular wave guide, the magnetic field components of the energy in the circular wave guide couple energy to sections 20 and 21 of the rectangular wave guide. The fields established in the sections 20 and 21 by virtue of this magnetic coupling, considered alone, are 180° out of phase, that is to say, at equal distances from the junction the electric field components of these waves are equal in magnitude and opposite in direction, as obtains in H-plane coupling.

Because the energy in wave guide 12 is circularly polarized, the electric field coupling and the magnetic field coupling described above each have their maximum amplitudes occurring 90° out of phase in time. However, the coupling by virtue of the electric field establishes a voltage maximum at the junction of the two wave guides, while coupling by virtue of the magnetic field establishes a voltage minimum at the junction with the voltage maximum spaced a quarter wave length or 90° away from the junction. This 90° displacement from the junction corresponds to the distance traveled by the voltage maximum established by the electric field coupling in the quarter of a cycle between the electric field coupling and the magnetic field coupling. Therefore, it will be seen that in one direction, for example, toward section 21, the fields established by the electric and magnetic fields are in phase and in the opposite direction, namely, toward section 20, are 180° out of phase. Effectively, then, energy circularly polarized in this first sense flows only into rectangular wave guide section 21. If the sense of the circular polarization is now reversed, then there will effectively be a 180° phase shift in either of the fields established by the electric field coupling or the magnetic field coupling (but not both of these fields) with the result that there will be cancellation in section 21 and reinforcement in section 20.

If power in the $TE_{01}$ mode having plane polarization is

While certain applications of the invention have herein been described, it will be apparent to those skilled in the art that other applications and modifications are possible. The scope of the invention is limited only by the appended claims.

introduced into the left end of rectangular wave guide 13 (section 20), then in accordance with the principles outlined above, this power will be coupled to circular wave guide 12 and will emerge at substantially full strength at the upper end of guide 12, but will be circularly polarized in one of the aforementioned senses. This is true because the coupling process between the two wave guides is reversible since all the circuit elements utilized in the process are bilateral in operation. Substantially no power will flow to the right of the junction into section 21. Conversely, if plane polarized energy in the $TE_{01}$ mode is introduced into the right end of wave guide 13, it will be coupled to circular wave guide 12 and emerge at the upper end thereof with circular polarization in the opposite sense, with no flow of energy to the left of the junction into section 20.

The above-described phenomena may to a certain extent be likened to the well known phenomena encountered in the "Magic T." Rectangular wave guide sections 20 and 21 may be considered, for the purposes of this analogy, as the branch arms of the "Magic T" which constitute the "straight through" elements of the junction. The coupling between the circular wave guide and the rectangular wave guide which is a result of the electric field may be compared with the arm which forms the E-plane T of the "Magic T," and the coupling between the circular wave guide and the rectangular wave guide which results from the magnetic field may be likened to the arm which forms the H-plane T with the branch arms of the "Magic T." In effect, then, the circular wave guide 12, carrying circularly polarized energy, serves in the same manner as the combination of the series and shunt arms extending from the branch arms of the "Magic T." Since the conventional "Magic T" depends for its operation on substantially equal H-plane and E-plane coupling, it follows, in accordance with this analogy, that the lateral displacement of the axis of the circular wave guide from the axis of the rectangular wave guide is such that the amounts of energy coupled magnetically and electrically between the two guides are substantially equal.

What is claimed is:

1. Guided wave apparatus for the transmission of electromagnetic energy comprising, a rectangular wave guide, a circular wave guide, said circular wave guide perpendicularly intersecting said rectangular wave guide, those portions of the wall of said circular wave guide intersected by said rectangular wave guide and of the walls of said rectangular wave guide intersected by said circular wave guide being removed to thereby provide a common opening between said guides, said opening being displaced from the longitudinal axes of both said rectangular and circular guides and proportioned to provide substantially equal amounts of electric and magnetic coupling of energy between said rectangular and circular guides.

2. Guided wave apparatus for the transmission of electromagnetic energy comprising, a rectangular wave guide having broad and narrow walls, a circular wave guide perpendicularly passing through the broad walls of said rectangular guide with the longitudinal axis of said circular guide being displaced transversely from the longitudinal axis of said rectangular guide, those portions of the wall of said circular wave guide intersected by said rectangular wave guide and of the walls of said rectangular wave guide intersected by said circular wave guide being removed to thereby provide a common opening between said guides, said opening being proportioned to effect substantially equal amounts of electric and magnetic coupling of energy between said wave guides.

3. Guided wave apparatus for the transmission of electromagnetic energy comprising, a rectangular wave guide having broad and narrow walls, a circular wave guide perpendicularly passing through the broad walls of said rectangular guides with the longitudinal axis of said circular guide being displaced transversely from the longitudinal axis of said rectangular guide, those portions of the wall of said circular wave guide intersected by said rectangular wave guide and of the walls of said rectangular wave guide intersected by said circular wave guide being removed to thereby provide a common opening between said guides, said opening being proportioned to effect substantially equal amounts of electric and magnetic coupling of energy between said wave guides, and means located in the region of said opening for matching the impedances of said rectangular and circular guides.

4. Guided wave apparatus for the transmission of electromagnetic energy comprising a rectangular wave guide having broad and narrow walls, a circular wave guide perpendicularly passing through the broad walls of said rectangular guides with the longitudinal axis of said circular guide being displaced transversely from the longitudinal axis of said rectangular guide, those portions of the wall of said circular wave guide intersected by said rectangular wave guide and of the walls of said rectangular wave guide intersected by said circular wave guide being removed to thereby provide a common opening between said guides, said opening being proportioned to effect substantially equal amounts of electric and magnetic coupling of energy between said wave guides, means disposed within said circular guide in the region of said opening for matching the impedances of said rectangular and circular guides.

5. Guided wave apparatus for the transmission of electromagnetic energy comprising a rectangular wave guide having broad and narrow walls, a circular wave guide perpendicularly passing through the broad walls of said rectangular guide with the longitudinal axis of said circular guide being displaced transversely from the longitudinal axis of said rectangular guide, those portions of the wall of said circular wave guide intersected by said rectangular wave guide and of the walls of said rectangular wave guide intersected by said circular wave guide being removed to thereby provide a common opening between said guides, said opening being proportioned to effect substantially equal amounts of electric and magnetic coupling of energy between said wave guides, and a plurality of concentric plungers closing the end of said circular wave guide for matching the impedances of said rectangular and circular guides.

References Cited in the file of this patent

UNITED STATES PATENTS

| | | |
|---|---|---|
| 2,106,769 | Southworth | Feb. 1, 1938 |
| 2,241,119 | Dallenbach | May 6, 1941 |
| 2,407,318 | Mieher | Sept. 10, 1946 |
| 2,416,080 | Bailey | Feb. 18, 1947 |
| 2,438,521 | Sharpless | Mar. 30, 1948 |
| 2,466,136 | Tuller | Apr. 5, 1949 |
| 2,473,274 | Bradley | June 14, 1949 |
| 2,562,332 | Riblet | July 31, 1951 |
| 2,607,849 | Purcell | Aug. 19, 1952 |
| 2,686,901 | Dicke | Aug. 17, 1954 |